United States Patent [19]

Zenger et al.

[11] Patent Number: 5,251,424
[45] Date of Patent: Oct. 12, 1993

[54] METHOD OF PACKAGING PRODUCTS IN PLASTIC CONTAINERS

[75] Inventors: Richard D. Zenger, Downers Grove; Stephen W. Cornell, Wheaton; E. James Schneiders, Winnetka, all of Ill.

[73] Assignee: American National Can Company, Chicago, Ill.

[21] Appl. No.: 863,157

[22] Filed: Apr. 2, 1992

Related U.S. Application Data

[63] Continuation of Ser. No. 639,974, Jan. 11, 1991, abandoned.

[51] Int. Cl.⁵ .................. B65B 31/04; B65B 7/28; B65B 63/08
[52] U.S. Cl. ........................................ 53/431; 53/432; 53/440; 53/471
[58] Field of Search ............... 53/403, 431, 432, 433, 53/440, 485, 471, 473, 425

[56] References Cited

U.S. PATENT DOCUMENTS

| | | |
|---|---|---|
| 2,978,336 | 4/1961 | Morrison . |
| 4,044,086 | 8/1977 | McChesney et al. . |
| 4,054,629 | 10/1977 | Wang et al. . |
| 4,219,526 | 8/1980 | Mehnert . |
| 4,233,022 | 11/1980 | Brady et al. . |
| 4,318,882 | 3/1982 | Agrawal et al. . |
| 4,458,469 | 7/1984 | Dunn ................................... 53/432 |
| 4,550,043 | 10/1985 | Beck . |
| 4,583,346 | 4/1986 | Kameda ................................ 53/431 |
| 4,588,000 | 5/1986 | Malin ............................... 53/431 X |
| 4,606,723 | 8/1986 | Pasternicki . |
| 4,662,154 | 5/1987 | Hayward . |
| 4,665,682 | 5/1987 | Kerins et al. ........................ 53/452 |
| 4,667,454 | 5/1987 | McHenry et al. ............... 53/440 X |
| 4,675,070 | 6/1987 | Pasternicki . |
| 4,696,580 | 9/1987 | Kameda . |
| 4,703,609 | 11/1987 | Yoshida et al. ..................... 53/431 |
| 4,711,624 | 12/1987 | Watson . |
| 4,717,525 | 1/1988 | Iizuka et al. . |
| 4,731,513 | 3/1988 | Collette . |
| 4,865,088 | 9/1989 | Stearns ........................... 53/431 X |

FOREIGN PATENT DOCUMENTS

| | | |
|---|---|---|
| 727465 | 7/1963 | Canada ................................ 53/432 |
| 1062671 | 9/1979 | Canada ................................ 53/403 |
| 1455652 | 1/1974 | United Kingdom ................. 53/431 |
| 2089191 | 6/1982 | United Kingdom ................. 53/431 |

Primary Examiner—John Sipos
Assistant Examiner—Linda B. Johnson
Attorney, Agent, or Firm—Wallenstein, Wagner & Hattis, Ltd.

[57] ABSTRACT

A method of hot filling a plastic container includes the steps of introducing a heated product into the container at a temperature of about 190° F., introducing liquid nitrogen into the container and sealing the container before any significant thermal distortion occurs and cooling the container to room temperature, while maintaining a positive pressure within the cooled container.

10 Claims, 1 Drawing Sheet

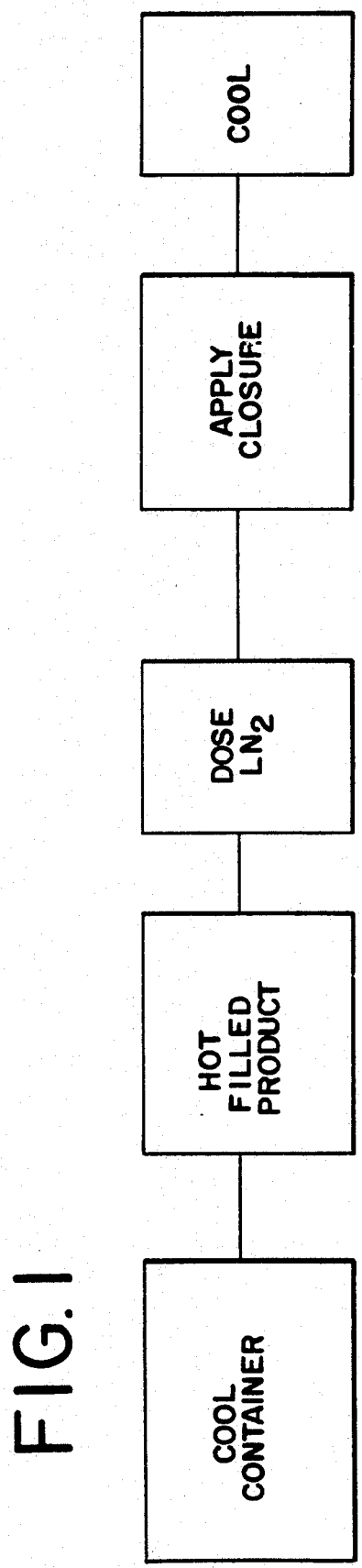

METHOD OF PACKAGING PRODUCTS IN PLASTIC CONTAINERS

This is a continuation of copending application Ser. No. 07/639,974, filed on Jan. 11, 1991, now abandoned.

TECHNICAL FIELD

The present invention relates to a method of packaging, in plastic containers, products which experience thermal events during processing or storage and more particularly to hot-filling products in containers of thermoplastic polyester material.

BACKGROUND OF THE INVENTION

The advantages of plastic containers in packaging over glass and metal containers is well known in the packaging art. However, utilization of plastic containers, in particular thermoplastic containers, in packaging presents some problems when the product to be packaged requires an elevated temperature during processing.

For example, some products are hot when filled into a container ("hot-filled"). Most comestible products are also pasteurized and/or sterilized once in the container (retort sterilization). Some products are heated by the consumer in the plastic package before consumption such as in boiling water or a microwave. These thermal events can cause problems with the integrity of the packaging.

Typically hot-filled applications involve heating products, usually comestibles, from above 140° F. to about 190° F., placing them in a container, and then sealing the container. Upon cooling of the product, the product shrinks in volume and thus a negative internal pressure results. Resulting pressure differentials create a net pressure force on the outside of the container wall, which can cause the container to buckle or collapse. Even more shrinkage of the product occurs when the package is cooled below ambient for storage.

Another significant problem that occurs when a product experiences a thermal event, such as either hot-filling a product or heating after filling, as in a pasteurization process, is that the plastic may shrink or distort due to its exposure to the hot product or by the externally added heat during the pasteurization. Pasteurization or sterilization of the package once sealed is customary for comestibles and usually involves spraying the container with hot water, usually at a temperature in the range of 140° F. to about 190° F. The container then goes through a cooling spray process to reduce the bottle temperature to approximately 95° F.

The thermal effects are particularly problematic in one type of container that has received considerable acceptance; a blow-molded bottle that has a hemispherical bottom and is supported through a separate base cup. Containers, according to this design, have found utility, for example, as bottles for soft drinks and other products which traditionally are placed in the container at low or moderate temperatures. However, due to the inherently high orientation of the polymer in a blow molded container, the thermal distortion or shrinkage is high upon exposure to elevated temperature. This thermal distortion can cause many problems with the package integrity.

For example, as a result of the plastic container shrinkage. The head-space volume may be reduced to a point where the product invades the upper portions of the container neck; too close to the mouth of the container. This can cause spillage when the closure is removed by a consumer or may make the product difficult to pour without spillage. This can also cause the fill-level of the product to be hidden by the closure which is generally opaque. This prevents visual inspection of the fill-level height or visual inspection of floating contaminants for quality control purposes.

Thermal distortion can also cause the container to be misshapen which causes problems including: neck finish distortion which can create problems in sealing the containers; bottom surface distortion which can cause the container to lean; and, aesthetic detraction.

Because of the heat distortion and the partial vacuum created in hot-fill applications, it has been customary to employ glass or metal containers for comestible products such as beverages, pharmaceuticals and the like, which are traditionally placed in these containers at an elevated temperature. However, the increased weight and cost of glass bottles or metal containers makes this solution economically unfeasible. Furthermore, glass bottles have an inherent problem of breaking upon sufficient impact.

There have been numerous attempts to solve these problems in stretched blown polyester containers for packaging warm or hot-filled products. For example, the industry has adopted methods of "heat treating" the container, or has attempted to utilize heat-resistant material co-extruded in conjunction with less costly resins. Deflectable container sections have also been employed to manage the negative pressure associated with products hot-filled, then cooled for consumer use.

Heat-treating or heat-setting is taught in a number of patents. Examples are U.S. Pat. Nos. 4,233,022 (Brady); 4,711,624 (Watson); and, 4,219,526 (Mehnert). Similarly, negative pressure management in plastic containers deflectable by use of geometry is taught in a number of recent patents. Examples are U.S. Pat. Nos. 4,318,882 (Argawal); 4,717,525 (Iizuka); and 4,665,682 (Kerins et al.).

In the heat-treating art, the thermoplastic material is formed into a shape and then subjected to heat, whereby the crystalline structure is changed. Generally, the crystalline percentage is increased, thereby increasing the heat distortion resistance of the final shape.

U.S. Pat. No. 4,550,043 (Beck) teaches the use of heat-resistant resin coextruded with other thermoplastics to form a thermally stable molded container suitable for hot-filled products that are pasteurized, while U.S. Pat. No. 4,731,513 (Collette) utilizes a hybrid reheating system to improve the heat distortion resistance of a hot-filled stretch blown container.

Initial attempts were also made for vacuum management in a plastic bottle through a specially-designed bottom which bows inwardly to accommodate the negative pressure. This purely pressure-induced movement, however, is not practical per se to prevent vacuum collapse in polyester containers because it is difficult to manufacture a base which behaves in the proper manner.

In a further effort to control vacuum in a PET container, large collapsible panels in the side wall have been used to control the size of the container as the internal pressure drops to a negative value. These containers have been proposed as a substitute for glass and have the advantages of lightweight, durable PET containers for a vast new segment of the consumer product packaging industry. Thus, for example, U.S. Pat. Nos. 4,318,882 and 4,717,525 provide a PET container which has at least one region which is thermo-elastically deformable inwardly after the container is hot-filled and sealed to control the vacuum. In both of these patent disclosures, the collapsible panel portions and the remainder of the container are heat-set at different temperatures which increases the time required for forming the container and also therefore increases the cost.

Another patent which shows the method for hot-filling collapsible-resistant polyester containers is disclosed in U.S. Pat. No. 4,665,682. This patent discloses a wide-mouth container that is formed from PET and has inwardly-directed ribs in the side walls to accommodate the vacuum that is produced when the hot-fill product is cooled.

Also, as noted, one prior art solution to the problems associated with thermal distortion of the plastic package involves applying a post-forming heat treatment or "heat set" to the molded container. While it may be possible to reduce the amount of thermal distortion of a PET container by this heat-treatment technique, the resultant container is not suitable for commercial hot-fill temperature applications.

While the methods discussed above appear to provide solutions for the container collapsing problem and thermal distortion problems when hot-filling products in plastic packages such as a PET container, these approaches have not been widely accepted in the management of thermal events like the hot-filling of a product. As is known, the differential heat setting or heat-treatment techniques require considerably longer mold residence time to produce the desired level of thermal conditioning and thereby reduces the productivity of the molding cycle, which is normally done in a two-stage, high-output intermittent, continuous motion, reheat-blow-molding machines.

Furthermore, the collapsible containers disclosed in the above patents are generally aesthetically unacceptable because it is difficult to apply the desired labeling on the finished container. With the larger collapsible control panels molded in the side walls, it is not practical to utilize the side wall of the container for the label.

If the side wall is used to support the label, the label cannot be adhered because the collapsing of the side wall will distort the label. If the label is not adhered, it can easily be torn or disfigured. For many hot-filled products, it is desirable to have the major portion of the container covered by the label and the non-circular nature of the prior art containers prohibits such type of labeling.

It should be noted that these problems are not found generally in soft drink packaging. Most soft drinks are carbonated and filled at lower-to-moderate temperatures so heat distortion is generally not problematic. Furthermore, it is noted that the internal pressure caused by the carbonation helps to prevent the flexible polyester container from collapsing during shipping and handling.

Thus, it has been recognized that in the packaging of products that are warm or hot-filled (80° F. to 200° F.), the thermoplastic package must have the ability to resist thermal distortion and the package must contain the negative pressure formed upon cooling. However, the hot-filling industry has not recognized that it is possible to achieve these results by providing a small quantity of a liquified gas to the contents of the hot-filled plastic container in a manner that capitalizes on the gas expansion to (1) offset the thermal distortion; and, (2) neutralize the negative pressure and form a positive pressure at storage and use conditions.

The use of positive pressure to rigidize a sealed deformable metal container is a well-known art. For instance, U.S. Pat. No. 3,699,740 (Knobe) has shown that it is possible to prevent container deformation during an air evacuation process in the filler that removes air from sensitive products to protect the flavor, while circulating an inert gas through the container at a pressure above the container deformation pressure during the filling operation.

Similarly, metal containers that are hot-filled are prevented from deformation, caused by a negative pressure that is developed upon cooling, through the addition of liquid nitrogen prior to sealing. Examples are Canadian Patent No. 1,062,671 (Cook) and U.S. Pat Nos. 2,978,336 (Morrison) and 4,583,346 (Kameda), issued to the Assignee. In the Morrison teaching, edible material is flushed with liquified nitrogen injected adjacent the bottom of the package and allowed to expand prior to sealing, thereby expelling the air. Cook provides a method that injects a small drop of liquid nitrogen into a filled metal can that is subsequently sealed. The expansion of the liquid nitrogen creates an internal pressure in the head space which increases the mechanical strength of the metal container.

However, none of the above references completely recognize the problems associated with hot-filling or thermal processing products in plastic containers and do not teach or suggest the use of introducing liquified gas into the plastic containers and sealing the container before any significant distortion occurs.

SUMMARY OF THE INVENTION

According to a broad aspect of the present invention, an improved method of packaging has been developed so that plastic containers may be used to package products where elevated temperatures are involved in the packaging, storage or end use of the product. Specifically, a predetermined quantity of a liquified gas is added to the contents of a plastic container in a manner that capitalizes on the gas expansion to (1) offset thermal distortion; and, (2) neutralize the negative pressure and form a positive pressure at storage and use conditions.

Accordingly, significant thermal shrinkage or distortion can be avoided in the plastic container due to hot-filling of a product, retort processing, pasteurization or sterilization processing, hot ambient storage, or end use heating such as in microwave applications. Pressurization of the container also provides enhanced stacking strength.

Thus, utilization of the present method provides a number of advantages not heretofore achieved including the following.

A primary advantage of this method is the ability to reduce wall thickness of the containers (i.e., "light-weighting").

Furthermore, a lower intrinsic viscosity plastic may be used, which is easier and less expensive to manufacture than plastic containers which are heat-treated or provided with cumbersome collapsible panels. For example, polyester which is to be heat-treated for sufficient thermal stability in hot-filling applications typically has an intrinsic viscosity of about 0.84, whereas the polyester used in non-hot-fill applications such as soft drink packages, has an intrinsic viscosity of about 0.65-0.72. The present invention has shown good results with material in the range of the latter.

Pressurization of the container also permits enhanced use of angled geometry containers (such as rectangular) or non symmetrical containers (such as off-set spouts) where the angled geometry normally causes concerns due to weak spots resulting from the blow-molding process.

Also, due to the lack of shrinkage, liquid levels can be maintained at an appropriate height in the neck finish of the container so that the level is easily monitored by visual inspection (in transparent containers) and so that spillage does not occur when the container is opened due to the liquid level being to close to the container opening.

In a preferred embodiment of the invention, the method provides that lightweight thermoplastic bottles, such as PET bottles, can be utilized for packaging of warm to hot-filled products without any significant changes in the blow-molding process, the filling process, the pasteurization process or the labeling process.

More specifically, according to the present invention, a heated product that is at a temperature of approximately 190° F. is introduced into a plastic PET bottle and a small amount of liquid nitrogen is introduced into the container after the hot-filled product and just prior to sealing the bottle with a closure. The liquid nitrogen continues to vaporize after the bottle has been sealed and thus applies a positive pressure within the container.

This positive pressure initially is preferably in the range of about 40 to about 50 psi, while the temperature of the product is at about 190° F. The positive pressure at this stage prevents thermal shrinkage or distortion of the plastic container due to its contact with the hot product. Accordingly, the container is sealed relatively quickly after introduction of the liquid nitrogen so as to obtain internal pressure before any significant shrinkage or distortion occurs.

The sealed package is then passed through a sterilization process wherein the temperature of the product and the container is gradually reduced to about 95° F. over a period of about 20 minutes. During this process, the positive pressure again helps to prevent thermal distortion of the container and upon cooling prevents container collapse due to negative pressure.

Also, during the filling process, the amount of head space is accurately controlled and the product fill level is maintained below the neck finish of the container so that adequate head space remains after normal refrigeration cooling of the product and a positive pressure is maintained at all times.

In the specific sterilization process that has been tested, the sealed container was subjected to a water spray at a temperature of about 190° F. for about 2 minutes and then the temperature was progressively decreased for the remaining 18 minutes to a temperature of about 95° F.

According to one aspect of the invention, the blow-molded PET plastic bottle is preferably formed with a hemispherical bottom which has a base cup applied thereto.

According to a further aspect of the present invention, the bottle is cooled below ambient temperature just prior to the introduction of the hot-filled product to absorb some heat from the product to minimize thermal distortion and the vacuum created when cooled.

In the molding of the PET bottle, a parison is initially formed and then is blow-molded in a heated mold which is heated sufficiently to produce some heat setting of the plastic during the hot blow-molding cycle. The molded PET bottle is then removed from the first mold and is introduced into a second mold that is cooled and the bottle is blow-molded to the final dimensional configuration. Sufficient heat is applied during the first blow-molding process so that the maximum shrinkage of the partially-formed bottle during transfer from the hot mold to the cold mold is less than about 0.5%.

The "heat set" is sufficient so that the bottle can contain a liquid at a temperature of about 165° F. with less than 1% shrinkage.

BRIEF DESCRIPTION OF DRAWINGS

The single FIGURE is a block diagram showing the various steps of the packaging process.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now to a preferred embodiment disclosed, a hot-filled product is packaged in a conventional PET plastic lightweight bottle that has a hemispherical bottom and is supported on a base cup. The bottle is preferably of the configuration shown in the Design application of Donald D. Cochran and Stephen W. Cornell, entitled "PLASTIC BOTTLE WITH BASE CUP", Ser. No. 200,181, filed May 31, 1988 (Our File No. 400D397), incorporated herein by reference.

The PET bottle with base cup has a hot product introduced therein which is at a temperature of about 190° F. A predetermined quantity of liquid nitrogen is then introduced into the container. The container is then sealed with a screw cap plastic closure before any significant shrinkage or distortion of the container occurs due to contact with the hot product. The product and container are then cooled down to room temperature during a sterilization process.

Preferably, a sufficient amount of liquid nitrogen is introduced into the container so that immediately upon vaporization after the closure has been applied thereto, the internal pressure of the package is on the order of about 25-50 psi.

The cooling process (typical of a pasteurization process) preferably involves initially subjecting the sealed container to a hot liquid spray having a temperature of about 190° F. for a period of about 2 minutes and then subjecting the container to progressively decreasing temperatures for the remaining cooling cycle, which is preferably a total of about 20 minutes.

It should be noted that ideally the container would require little or no thermal conditioning and that the container could be sealed with internal pressure before any thermal distortion takes place. However, a particular packager's closing operation may necessitate longer time periods that the hot product is in contact with the container before closing and resulting pressurization. In that case, the container will have to rely on some degree of conventional measures in addition to the pressurization to cumulatively prevent undesired thermal distortion. For example, more extensive heat treating of the container may be necessary. However, even in such an instance, the present method will reduce the amount of thermal conditioning necessary.

Accordingly, one aspect of the invention provides that the plastic bottle is preferably initially formed with a desired level of thermal conditioning so that the bottle is capable of holding a liquid product having a temperature of about 165° F. with less than 1% container volume shrinkage. The blow-molded bottle is preferably formed in a two-stage, high-output blow-molding machine wherein a parison or preform is initially blow-molded in a heated mold to substantially the final configuration and is then removed from the first mold and introduced into a second cold mold where the bottle is blown to its final configuration. During the transfer process, the shrinkage of the bottle is preferably less than 0.5%.

Preferably the PET bottle is also formed with sufficient biaxial orientation to withstand the contemplated internal pressures.

As indicated above, the bottle preferably is what is termed a lightweight PET bottle, which in the embodiment illustrated in the above disclosure (400D397) having a 38 mm neck finish, preferably has a weight of about 57 grams, while the weight of the base cup is about 13 grams, to make the total container weight of 70 grams. This total weight is substantially less than the traditional one-piece two-liter plastic bottle, despite the 38 mm neck finish. For example, present day commercial containers without base cups contain at least 80 grams of PET.

Also, the bottle design is such that there are no vertical or horizontal ribs in the area normally occupied by the label. This drastically reduces the costly line modifications and recapitalization of a packaging and filling plant. Notably, the molds required to provide such ribs or panels Also, the use of recycled PET for the base cup further reduces the material cost for manufacturing the bottle.

Because the container will be subjected to thermal events, care is taken to properly center the base cup on the container to avoid "leaning" of the container due to any uncontrolled thermal distortion. The base cup is also molded with a certain degree of orientation for strength and some degree of crystallization is also provided in the area of the sprue for the base cup.

The base cup is preferably formed from recycled PET material to reduce the overall cost of the package and enhance its environmental acceptability. The base cup may also be made of a high density polypropylene or high temperature polyethylene for dimensional stability.

EXAMPLE I

Currently-available 52 gram PET two-liter bottle preforms were blown into 28 mm neck finish bottles using the heated mold and cold mold process. Some of these bottles were hot-filled with 190° F. juice to a level below the neck finish and dosed with 3 doses of liquid nitrogen before closing and sealing with a polypropylene beverage closure. The initial pressurization, after closure, of 45-50 psi was achieved with about 3 doses (about 1.2 grams total). These bottles were then passed to the pasteurizer and emerged from the pasteurizer with the pressure drop being in the range of 21-29 psi due primarily to bottle expansion and initial head space variation and cooling of the products.

These bottles had 12-20 psi, respectively, after 42 hours at room temperature and the pressure dropped an additional 3 psi after 4 hours in a 40 degree cooler. However, it should be noted that even after a period of refrigeration, a positive pressure was still maintained within the containers and there was no "paneling" effect observed in the tests that were conducted.

EXAMPLE II

Some of the 52 gram PET two-liter bottles were hot-filled with 190° F. juice and dosed with two drops of liquid nitrogen (about 0.8 grams) before closing and sealing with a polypropylene beverage closure. The initial pressurization after closure was 29 psi and the pressure dropped 5-6 psi after passing through the pressurizer. The pressure dropped an additional 3 psi after remaining at room temperature for 42 hours and dropped another 3 psi after four hours in a 40° F. cooler.

EXAMPLE III

Some of the bottles were hot-filled with 190° F. juice and were pressurized to 18 psi using a nitrogen gas pressurization technique. The pressure of these bottles was 2-4 psi after emerging from the pasteurizer and dropped to zero after 42 hours at room temperature.

In all of the above Examples I-III, the time between filling and sealing the containers was approximately 15 seconds.

The exact range acceptable elapsed time between hot-filling and sealing have not yet been explored. However, according to one aspect of the invention, the time period should be sufficiently short to allow a positive pressure to develop in the container before any unacceptable amount of thermal distortion of the container takes place due to its contact with the hot product. Acceptable time periods will vary depending on the amount of acceptable distortion for a given packaging application. The acceptable amount of time will also depend on the temperature of the hot-filled product and the type of plastic used and the thermal and molding history of the container. For example, some plastics have a lower thermal distortion temperature than others. Also, a particular container may be highly oriented due to the blow-molding process and thus more susceptible to thermal distortion.

From the above examples, it appears that a required dosage of at least about 1.0-1.2 grams of liquid nitrogen is required to maintain a positive pressure when the two-liter bottles are filled with 190° F. product and then cooled down to about 40° F. Of course, the amount of liquid nitrogen will be dependent upon the size of the container, the head space, the temperature of the hot-filled product and the room temperature. The dosage of liquid nitrogen required will also vary with this time. For example, the longer a container remains unsealed, the more liquid nitrogen boils off to the atmosphere.

The exact initial pressure requirements have not been fully explored. However, for the purpose of the present invention, the initial pressure should be such that a positive pressure is maintained in the container from the time it is sealed through its normal useful life, including transportation and normal household refrigeration without any significant container distortion.

The liquified gas is disclosed as being liquid nitrogen, but other liquified gases, such as carbon dioxide or blends, could be utilized.

The temperatures disclosed are those generally associated with "hot-filled" products. However, it should be appreciated that the present method contemplates the disclosed advantages wherever a product-fill temperature is elevated during or after filling and sealing to a temperature above use or storage temperature. The method may also be used on other than comestibles. For example, the method may be used to provide internal pressure in a plastic bottle for motor oil. Motor oil is frequently filled at 105° F. to 110° F. to reduce viscosity for filling.

The specific container disclosed is a conventional 2-liter cylindrical PET bottle. However, the present method contemplates applicability to other than plastic bottles, for example plastic bags, trays, cans, bowls and drums. The method also contemplates other than PET plastic such as polyethylene, polypropylene, polycarbonate, acrylonitrile, copolymers or multilayer coextrusions with PET.

It is preferable for the plastic to have good barrier resistance for maintaining the internal pressure for extended shelf life. For example a PET bottle barrier layered with EVOH may provide 3-5 years shelf life at the disclosed pressures with nitrogen.

While the specific embodiments have been illustrated and described, numerous modifications come to mind without significantly departing from the spirit of the invention and the scope of protection is only limited by the scope of the accompanying claims.

What is claimed is:

1. A method of hot-fill packaging a product comprising the steps of:
   providing a blow-molded plastic container having an inherently high polymer orientation and subject to thermal deformation at an elevated hot-fill temperature;
   introducing product into said plastic container at said elevated hot-fill temperature;
   introducing a predetermined quantity of liquified gas into the container;
   permitting said gas to begin to vaporize; and
   rapidly sealing the container before any significant thermal distortion of the container occurs, and to retain an amount of said vaporized gas sufficient to provide a positive pressure within said container and, thereby, to prevent thermal or vacuum induced deformation of said container.

2. The method of claim 1, in which said liquified gas is liquid nitrogen.

3. The method of claim 1, in which said liquified gas vaporized sufficiently after sealing to initially pressurize said container to at least 40 psi.

4. The method of claim 3, including the step of cooling said package product to a refrigerator temperature of about 40° F., in which said vaporized nitrogen maintains a positive pressure in said container when said packaged product is cooled to said refrigerator temperature of about 40° F.

5. The method of claim 1, including the further step of cooling the container below room temperature before the heated product is introduced into the container.

6. The method of claim 1, in which the temperature of the introduced heated product is in the range of 80° F. to 200° F.

7. The method of claim 1, in which the temperature of the introduced heated product is about 190° F.

8. The method of claim 1, wherein the container is adapted to be opened for consumption and the liquified gas initially pressurizes the container sufficiently to maintain a positive pressure within the container until opened for consumption.

9. The method of claim 1 wherein the plastic container is polyethylene terephthalate with an intrinsic viscosity of about 0.65-0.72.

10. The method of claim 1 wherein the container includes a closure and the method including maintaining a product fill level below the closure.

* * * * *